F. S. STAFFORD.
WHEEL.
APPLICATION FILED DEC. 5, 1919.
1,395,456.
Patented Nov. 1, 1921.
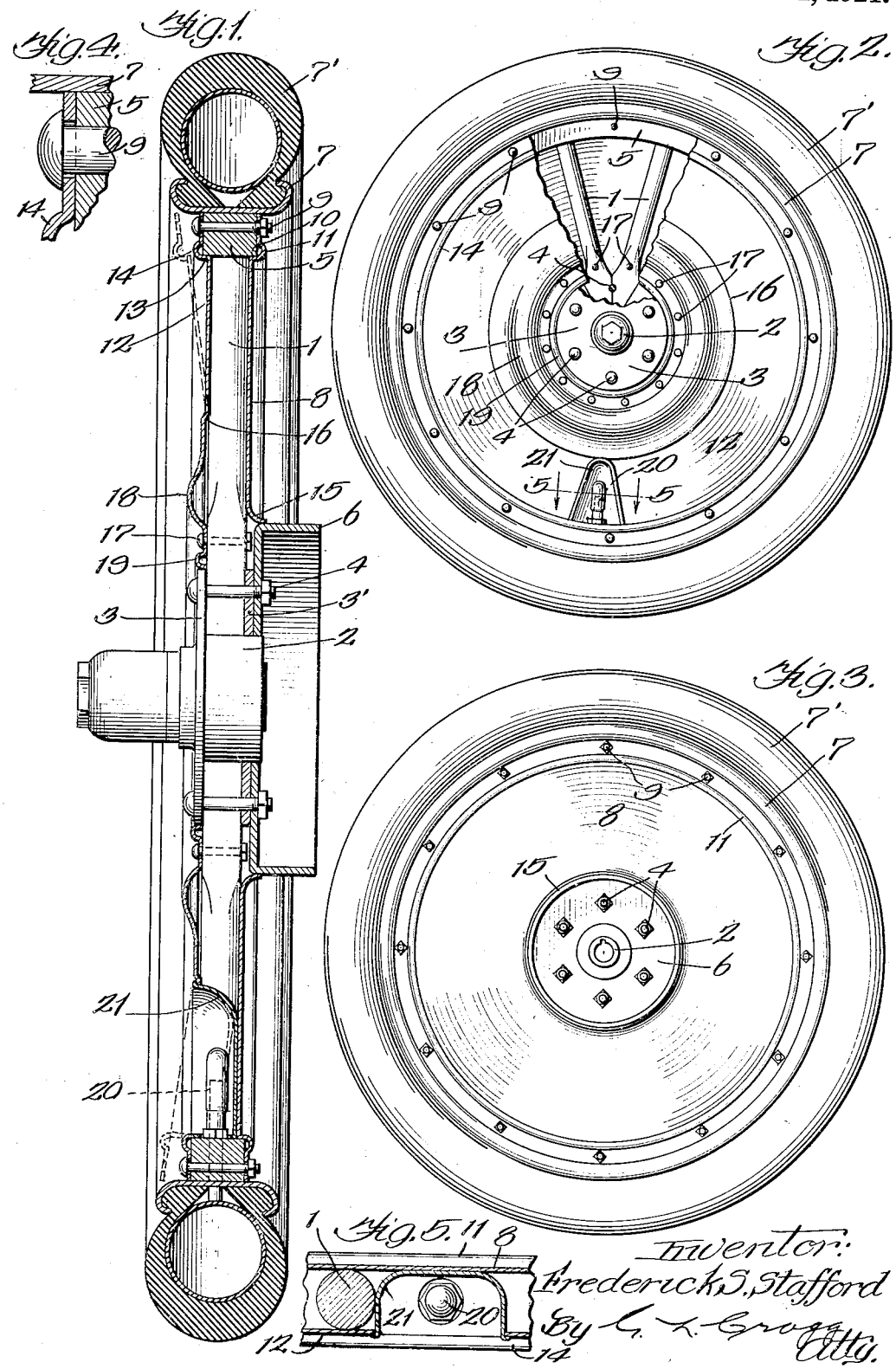

UNITED STATES PATENT OFFICE.

FREDERICK S. STAFFORD, OF CHICAGO, ILLINOIS, ASSIGNOR TO HENRY G. SAAL, OF CHICAGO, ILLINOIS.

WHEEL.

1,395,456.  Specification of Letters Patent.  Patented Nov. 1, 1921.

Application filed December 5, 1919. Serial No. 342,641.

*To all whom it may concern:*

Be it known that I, FREDERICK S. STAFFORD, citizen of the United States, residing at Chicago, in the county of Cook and State of Illinois, have invented a certain new and useful Improvement in Wheels, of which the following is a full, clear, concise, and exact description.

My invention relates to wheels and is of particular service in the formation of vehicle wheels employed in the manufacture and reconstruction of motor vehicles though the invention is not to be limited in its use.

In carrying out certain characteristics of my invention I employ a metal disk formed with a peripheral shoulder upon its inner face, this shoulder being surrounded and engaged by the wheel rim or the felly portion of such rim if the wheel happens to carry a pneumatic or other tire. This shoulder is preferably formed by providing the disk with an outwardly bulging circular bead extending farther inward upon its inner circle to form the shoulder and being surrounded by and joining with a circumscribing ring portion of the disk which is secured to the wheel felly by bolts. In the form of the invention herein disclosed, the disk is provided with a circular opening at its central portion, this opening being sufficiently large to receive a hub portion of the wheel with which the disk is in engagement.

A wheel embodying the preferred form of my invention employs spokes, preferably of wood, which radiate from a hub at their inner ends and are attached at their outer ends to a wheel rim or felly, and two disks between which the spokes are disposed. Before the application of at least one disk to the wheel it is sufficiently dished to be engageable with the wheel spokes along a circular line well within the rim or felly of the wheel and to flare away from the wheel from the places of contact of the disk with the wheel spokes. Bolts are employed to clamp the central portion of at least one disk and the felly portions of both disks and the wheel together. In this clamping operation the effect of the resiliency of the dished disk is overcome and both disks are brought in close engagement with the wheel spokes and to engage the shoulders at the peripheries of the disks with the felly of the wheel. A wheel thus constructed is free of noisy vibration of the disks and is well adapted to previously constructed wooden wheels which are thereby strengthened or restored in strength to make them of further service if about worn out and improving them in appearance.

My invention also includes such a formation of a disk in a pneumatic motor vehicle wheel (whether such disk supplements or is used in place of spokes) that the air nipple may be accessible therethrough.

There are other features of my invention which will be more fully explained in connection with the accompanying drawing illustrating the preferred embodiment thereof as applied to a driving vehicle wheel of an automobile, but to which embodiment the invention is not to be limited. In the drawing Figure 1 is a diametrical sectional view of a wheel embracing the invention; Fig. 2 is an outer face view of the wheel shown in Fig. 1 with parts broken away; Fig. 3 is an inner face view of the wheel; Fig. 4 is an enlargement of a detail of construction as it appears in Fig. 1; and Fig. 5 is a sectional view on line 5—5 of Fig. 2.

Like parts are indicated by similar characters of reference throughout the different figures.

I have illustrated a common form of wooden spoked driving automobile vehicle wheel to which my invention is applied. The wheel shown includes wooden spokes 1 having widened bases that bring adjacent ones of them in contact with each other where they immediately surround the hub 2 that is formed preferably of metal. The hub has a circular flange 3 between which and a circular clamping plate 3' the bases of the spokes are clamped by means of bolts 4. The automobile wheel illustrated is a propelling wheel, and is, therefore, equipped with a brake drum 6 clamped to the hub portions of the wheel spokes by the aforesaid bolts 4. The spokes are joined, at their outer ends, with a felly 5 constituting a tire supporting wheel rim. A tire retaining rim 7 surrounds and is secured to the felly when the wheel is pneumatic. A pneumatic tire 7' is held by said tire supporting rim.

Metal disk 8 is disposed upon the inner face of the wheel, this disk being secured in place by means of bolts 9 that pass through the rim portion 5 and clamp the peripheral portion of said disk against the inner face of said rim portion. The wheel rim portion 5 has its inner circular face supported and seated upon or in snug engagement with an annular shoulder 10 which is preferably formed upon the disk 8 by producing thereon an outwardly bulging bead 11 which is concentric with the periphery of the wheel and said disk. The inner circular side of said bead is wider than its outer circular side so that the circumscribing ring like or peripheral portion of the disk that is clamped to the ring portion 5 will be in a plane that is outwardly beyond the general plane of the disk portion supporting shoulder 10 so that the formation of a shoulder adapted to the support of the rim portion 5 illustrated is assured. The invention, however, is not to be limited to this construction for producing the shoulder which would not be required with all shapes of the rim portion 5.

Another metal disk 12 is disposed upon the wheel, this second disk being upon the outer face of the wheel, the same bolts 9 that clamp disk 8 to the periphery of the wheel rim portion 5 also performing this function upon disk 12, these bolts clamping the peripheral portion of disk 12 against the outer face of said rim portion. The wheel rim portion 5 has its inner circular face also supported and seated upon or in snug engagement with a shoulder 13 which is preferably formed upon the disk 12 by producing thereon an outwardly bulging bead 14 which is concentric with the periphery of the wheel and said disks. The inner circular side of said bead 14 is wider than its outer circular side so that the circumscribing ring like or peripheral portion of the disk 12 that is clamped to the rim portion 5 will, as in the case of disk 8, be in a plane that is outwardly beyond the general plane of the disk portion supporting the shoulder 13 so that the formation of a shoulder adapted to the support of the rim portion 5 illustrated is assured. As hitherto stated, the invention is not to be limited to this construction for producing the shoulder.

The holes in the disks 8 and 12 that receive the bolts 9 are elongated or enlarged radially of the wheel, preferably upon opposite sides of the bolts, to permit of slight movements of the disks in the plane of and with reference to the wheel. This construction avoids such rigid interrelation between the disks and the wheel structure or wheel elements interposed therebetween as would prevent slight yielding of the rim portion of the wheel with respect to the hub portion. This construction also permits the disks to yield resiliently between their peripheral portions and their central portions, particularly if the latter portions are so secured to or so engage the hub portions of the wheel as to be substantially immovable with respect thereto.

The wheel illustrated is an automobile propelling vehicle wheel having the aforesaid brake drum constituting an inner hub portion. The inner disk 8 is formed with a flange or shoulder 15 preferably curled, that is in snug engagement with the cylindrical portion of the brake drum 6, this flange also forming a centering device for the disk 8 in the assembly thereof with the wheel.

The disks are formed preferably of spring steel about one sixteenth of an inch in thickness. Before the application of the disk 12 to the wheel it is preferably generally concave or of dish form, as illustrated by dotted lines, being constrained to its flatter form by means of the bolts 9. The rim of the bottom of the initially dished disk is formed by means of a shoulder forming bead 16 which is concentric with the wheel and its disks, this shoulder extending inwardly beyond the portion of the disk it circumscribes to constitute the shoulder fulcruming edge, engaging the wheel spokes 1, upon which such disk is brought from its outwardly flaring form illustrated by dotted lines to its flatter form by the action of the clamping bolts 9, this circumscribed or central disk portion being clamped to the wheel by the bolts 17 passing through the bases of the spokes. By this construction the disk 12 is pressed against the wheel spokes in a manner to prevent rattling and to reinforce and strengthen the wooden portion of the wheel, the disks of my invention being applicable to worn wooden wheels as well as being of service in the formation of new wheels.

A large outwardly bulging annular swell 18, concentric with the wheel and its disks, is formed in the disk 12 closely adjacent and surrounding the annular row of bolts 17, this swell contributing to the ornate appearance of disk 12 and imparting a small degree of flexibility to the disk that readily permits the disk to be changed from its dish formation to its flatter formation when it is clamped in place at its central and peripheral portions. This swelling formation 18 also adds a spring or resilient quality to the disk 12 which urges the annular shoulder 16 against the spokes 1 of the wheel and maintains this shoulder and these spokes in engagement during and after the flattening of the disk resulting from the clamping action of the bolts 9. The annular portion of the disk engaged by the bolts 17 is flat. The disk 12, in the embodiment of the invention illustrated, has a central circular opening that receives the hub flange 2. This central opening is bordered by an outwardly projecting annular bead 19 in snug engagement with the periphery of the circular hub flange 3. The edge or shoulder 19 also forms a centering device in the assembly of disk 12 with the wheel.

The outer disk 12 is provided with a recessed formation at which there is accessibly disposed the usual nipple 20 employed for connection with a source of air under pressure and having connection with the inner tube of the tire whereby the tire may be inflated or replenished with air under pressure. A pocket formation 21, opening outwardly, is preferably provided to receive said nipple. The pocket formation may be a separate piece of shaped sheet metal interlocked at its forward edge with the portion of the disk (12) margining the recess formed therein. The nipple and the pocketed formation receiving it are between adjacent wheel spokes (where spokes are employed) being just as accessible for manipulation as though the disks were absent.

While I have herein shown and particularly described the preferred embodiment of my invention I do not wish to be limited to the precise details of construction as changes may readily be made without departing from the spirit of my invention, but having thus described my invention I claim as new and desire to secure by Letters Patent the following:—

1. A wheel having spokes and a rim portion upon said spokes and formed with an inner circular face; in combination with a disk engaging the inner circular face of said rim portion, said disk being formed of resilient metal of dish form flaring away from the wheel when its resiliency is unconstrained and then engageable with the wheel spokes at its unflaring portion and constrained to flatter form when secured to the wheel.

2. A wheel having spokes and a rim portion upon said spokes and formed with an inner circular face; in combination with a disk formed with an annular shoulder engaging the inner circular face of said rim portion, said disk being formed of resilient metal of dish form flaring away from the wheel when its resiliency is unconstrained and then engageable with the wheel spokes at its unflaring portion and constrained to flatter form when secured to the wheel.

3. A wheel having spokes and a rim portion upon said spokes and formed with an inner circular face; in combination with a disk formed with an annular shoulder engaging the inner circular face of said rim portion and which shoulder is surrounded by a ring portion of the disk that is bolted against said rim portion, said disk being formed of resilient metal of dish form flaring away from the wheel when its resiliency is unconstrained and then engageable with the wheel spokes at its unflaring portion and constrained to flatter form when secured to the wheel.

4. A wheel having spokes and a rim portion upon said spokes and formed with an inner circular face; in combination with a disk formed with an annular bead whose inner circular side is wider than its outer circular side to form a shoulder which engages the inner circular face of said rim portion, said bead being surrounded by a ring portion of the disk which is bolted against said rim portion, said disk being formed of resilient metal of dish form flaring away from the wheel when its resiliency is unconstrained and then engageable with the wheel spokes at its unflaring portion and constrained to flatter form when secured to the wheel.

5. A wheel having spokes and a tire; in combination with a disk substantially covering a face portion of the wheel that is surrounded by the tire and secured against the wheel and formed of resilient metal of dish form flaring away from the wheel when its resiliency is unconstrained and then engageable with the wheel spokes at its unflaring portion and constrained to flatter form when secured to the wheel, said disk having an outwardly bulging annular swell surrounded by the unflaring portion of the disk where engaging the wheel spokes, said disk also having an annular portion surrounded by said outwardly bulging swell of the disk; and bolts assembling this annular portion with the wheel spokes.

In witness whereof, I hereunto subscribe my name this eighteenth day of November, A. D., 1919.

FREDERICK S. STAFFORD.